United States Patent
Yoshida et al.

[15] 3,690,795
[45] Sept. 12, 1972

[54] BLADDER CLAMPING DEVICE FOR PRESS FOR SHAPING AND CURING PNEUMATIC TIRES

[72] Inventors: Shoushi Yoshida, Higashinada-ku, Kobe; Atsuaki Iwama, Nada-ku, Kobe; Takashi Okada, Tarumi-ku, Kobe; Tetuo Suda, Nada-ku, Kobe, all of Japan

[73] Assignee: Kobe Steele, Ltd., Kobe, Japan

[22] Filed: Oct. 5, 1970

[21] Appl. No.: 78,021

[30] Foreign Application Priority Data

Oct. 6, 1969  Japan ...................... 44/80071

[52] U.S. Cl. ........................................ 425/29, 425/58
[51] Int. Cl. ............................................ B29h 5/02
[58] Field of Search ....... 18/2 TP, 2 HA, 17 W, 17 K, 18/17 C

[56] References Cited

UNITED STATES PATENTS

| | | |
|---|---|---|
| 3,465,385 | 9/1969 | Zangl ........................ 18/17 W |
| 3,581,345 | 6/1971 | Ulm et al. .................. 18/17 K |
| 3,487,507 | 6/1970 | Turk ..................... 18/17 C UX |
| 3,171,162 | 3/1965 | Soderquist ................. 18/17 W |
| 2,978,741 | 4/1961 | Soderquist ................. 18/2 TP |

Primary Examiner—J. Howard Flint, Jr.
Attorney—Hamilton, Cook, Renner & Kenner

[57] ABSTRACT

A press for shaping and curing tires having an inflatable bladder with a device for positively clamping the lower bead of the bladder between a lower stationary bead ring and a lower plate ring connected with the vertical cylinder of the center mechanism wherein the vertical cylinder is raised and lowered by an actuating device having a drive unit, a power converting mechanism transforming the output of the drive unit into mechanical motion acting in a direction axially of the vertical cylinder, and a motion transmitting device connecting the output of the power converting mechanism to the vertical cylinder.

3 Claims, 2 Drawing Figures

INVENTOR
SHOUSHI YOSHIDA
ATSUAKI IWAMA
TAKASHI OKADA
TETSUO SUDA
BY
ATTORNEYS

INVENTORS
SHOUSHI YOSHIDA
ATSUAKI IWAMA
TAKASHI OKADA
TETSUO SUDA
BY
ATTORNEYS

BLADDER CLAMPING DEVICE FOR PRESS FOR SHAPING AND CURING PNEUMATIC TIRES

BACKGROUND OF THE INVENTION

The present invention relates to mechanism enabling the clamping and unclamping, with extreme ease, in the simplest manner, and with a minimum of labor, of an inflatable bladder or permanent bag for use in a press for shaping and curing the pneumatic tires having a pair of relatively movable mold sections. As is well known, presses for shaping and curing pneumatic tires normally incorporate an elastomeric bladder to maintain the exact internal configuration of the green tire being processed in shaping and curing operations.

According to the conventional technique, a bladder having a generally cylindrical form is secured in place in the press by clamping for engaging a green tire during shaping and curing. The clamping therefore is usually accomplished by joint action of plate rings and bead rings located inside and outside the bladder, respectively, at both the top and bottom of each of the bladder beads, to enclose the beads between the rings which are bolted together securely for clamping action. This type of clamping, however, is characteristically accompanied by substantial difficulties, such as extreme problems in achieving exact interfitting of the rings with the beads of the bladder when a new bladder is to be installed in a press because of the location of the bladder unit between the mold sections and attached to one of the mold sections. To overcome difficulties of this type, a technique of rigging the bladder unit is utilized employing spare bead rings and plate rings remote from the press for subsequent installation of the so prepared bladder unit in the press. This technique of bladder installation, however, has the disadvantage that is requires the use of power equipment, such as a fork lift, and a plurality of workers to participate in positioning the new bladder due to the weight of the ring members.

Additionally, operation of a press of a type described above for shaping and curing the pneumatic tires is normally performed in such a manner that the bladder unit is held in place and properly adjusted with respect to the contour thereof by a center mechanism located centrally of the mold sections in the press. Such center mechanism has a piston and a vertical cylinder housing the piston. It is normally necessary to readjust the piston rod in the vertical cylinder with respect to the length extending into the bladder every time the bladder unit is replaced. Such adjustment requires additional trips by operating personnel between the control center and the remotely located press, thereby necessitating additional labor expense and reducing the operating time of the presses.

More recently, another bladder clamping device has been proposed which eliminates the use of bolts to hold the rings together securely. This clamping device is controlled by properly adjusting the level of the vertical cylinder relative to other components in the center mechanism to secure the bladder, similar to the piston adjustment described above. This type of clamping device overcomes the disadvantages inherent in a clamping system employing bolting, but, is subject to low operating efficiency resulting from the necessity of manual operations of the type described above and requires rotating the ring members for threaded engagement.

SUMMARY OF THE INVENTION

It is a primary object of the present invention, therefore, to provide a unique clamping device to secure the bladder on a tire shaping and curing press by mechanical control without the need for bolting and with reduced difficulties in handling the clamping member, leading to improved efficiency in replacing a bladder. According to the present invention, a clamping device secures the upper bead of the bladder in the same manner as in the conventional practice; however, the lower bead of the bladder is mechanically secured, not by bolt, but by vertical movement of the center mechanism controlled by a suitable actuating member. Since the lower bead of the bladder is secured integral with the lower mold section according to the arrangement contemplated in the present invention, the upper bead of the bladder is sufficiently accessible such that it may be secured by bolting with relative ease.

According to the present invention, the simplified mechanical clamping device secures the lower bead of the bladder in place relative to the center mechanism. Since the lower bead of the bladder normally has a nearly T-shaped section which is directed toward the axis of the vertical cylinder it is desirable to engage the bead on both sides thereof, top and bottom, with the clamping members for attachment to the center mechanism. The underside of the lower bead with T-shaped section is faced with the so-called bead ring which is secured to the bottom mold, while the upperside of the same is faced with a flange of the plate ring which is secured to the top of the vertical cylinder portion of the center mechanism. Thus, the lower bead of the bladder is secured in place sandwiched between the lower bead ring and a flange of the lower plate ring.

According to the present invention, a unique actuating device causes the vertical cylinder of the center mechanism to move either upward or downward as may be required for properly vertically positioning the attached lower plate ring. The actuating device contains a suitable drive unit providing the mechanical power necessary for raising or lowering the entire vertical cylinder. The drive unit is preferably a suitable pneumatic or hydraulic cylinder located outside the center mechanism and remotely controlled. The actuating device also has a power converting mechanism for adapting the power provided by the drive unit into suitable mechanical form for raising or lowering the vertical cylinder of the center mechanism. A preferred type of power converting mechanism is a mechanical linkage and, more particularly, one which includes a toggle joint to ensure dependable clamping. The actuating device also may have a power transmitting device serving to transmit the mechanical power, adapted to act in a direction axially of the vertical cylinder by the converting mechanism, to the cylinder which is thereby operatively moved either up or down to release or secure the bead of the bladder.

The improved clamping device according to the present invention ensures the extreme ease of bladder renewal or replacement by only one workman within a short time period. Further, a pushbutton system or the like may be included to provide simple remote control for automatic clamping and unclamping for the reason that the lowering motion of the vertical cylinder necessary for clamping is provided by a relatively small power drive unit operating through a mechanical linkage. The use of a link mechanism incorporating a toggle joint, as described precedingly, provides locking of the linkage, thereby excluding the possibility of unexpected unclamping in the event of accidental withdrawal of the pneumatic or hydraulic fluid out of the power cylinder and provides increased availability of mechanical power from a small power source, thereby ensuring the economy of highly simple apparatus for positive clamping and unclamping of the bladder.

Other objects and a fuller understanding of the present invention may be had by referring to the following description and claims, taken in conjunction with the accompanying drawings.

DESCRIPTION OF THE PREFERRED EMBODIMENT

Figure 1:
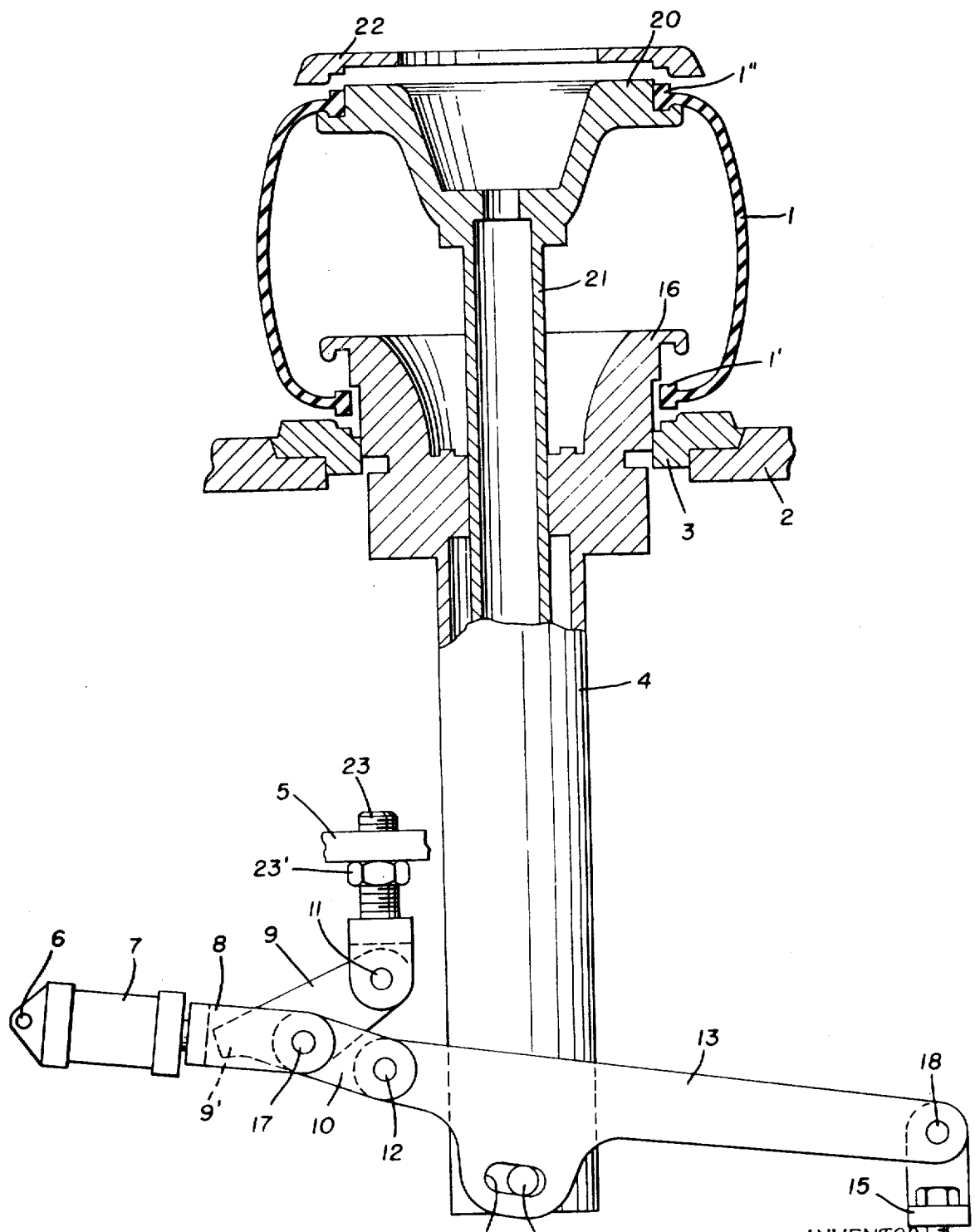
FIG. 1 is an elevation view, partly in section, illustrating a bladder clamping device according to a preferred form of the present invention, and showing particularly the relationship of the components with the bladder unclamped for removal.
Figure 2:
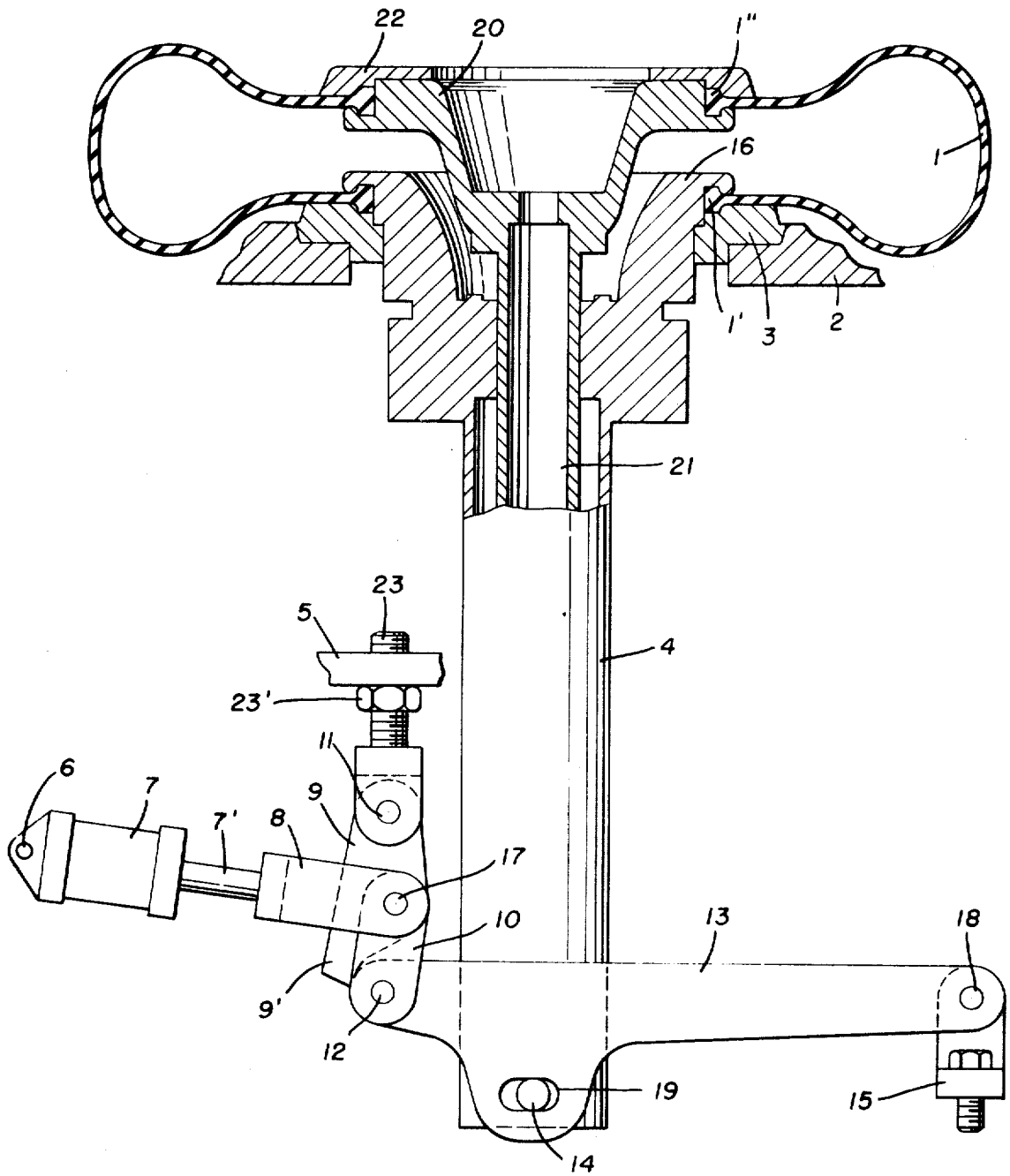
FIG. 2 is an elevation view, partly in section, similar to FIG. 1 showing particularly the relationship of the components with the bladder clamped for press operation.

Referring now to the drawings, an inflatable bladder 1 for shaping and curing of a pneumatic tire having a lower bead 1' of substantially T-shaped cross-section which is located and held between a stationary lower mold section 2 and particularly a lower bead ring 3 attached thereto, and a plate ring 16, concentric with lower mold section 2, and connected to a vertical cylinder 4. The lower bead 1' of the bladder is clamped and unclamped by lowering and raising the cylinder 4 carrying plate ring 16 as seen in FIGS. 2 and 1, respectively. When unclamped, the bladder 1 may be readily removed with a suitable hand tool which can be inserted between lower plate ring 16 and the bead ring 3 to free the lower bead 1'.

The vertical motions of the cylinder 4 are accomplished by an actuating device in which suitable lugs 5 and 15 and a pin 6 are connected to the lower base of the press or other stationary component. A power converting mechanism is made up of toggle links 9 and 10 pivoted on spaced ends thereof by pins 11 and 12 and connected together by a clevis 8 and pivot pin 17. The clevis 8 is in turn connected with a piston rod 7' of a power cylinder 7 constituting a pneumatic or hydraulic drive unit. A lever 13 constituting a motion transmitting device is pivoted to the toggle link 10 by the pin 12 on one end and to the bearing lug 15 by a pin 18 on the other end and has an elongated slot 19 to accommodate a projecting pin 14 connected to the bottom end of the vertical cylinder 4. The specific toggle arrangement undoubtedly represents only one example of mechanical apparatus suitable for carrying out the described functions.

As seen in FIG. 1, an upper plate ring 20 is connected to a piston rod 21 located in and concentric with the vertical cylinder 4. A bead ring 22 or other clamping member, either integral with or separate from the upper plate ring 20, cooperates to selectively hold upper bead 1" of the bladder 1.

Advantageously, in the operation of the embodiment of the present invention, the retiring stroke of a piston in the power cylinder 7 produces a simultaneous movement (from position of FIG. 2 to FIG. 1) of the clevis 8, leading to the collapse of the toggle links 9,10. The pin 12 thus approaches fixed pin 11 causing the end of lever 13 proximate pin 12 to be raised towards the fixed bearing lug 5 carrying the pin 14 in elongated slot 19 of lever 13. Since pin 14 is connected to cylinder 4, this in turn gives rise to upward motion of the vertical cylinder 4 which produces simultaneous vertical travel of the lower plate ring 16 which unclamps the lower bead 1' of the bladder 1. The bladder 1 is thus ready for removal with a suitable tool from the gap between the clamping members, top and bottom, as it has been expanded by the piston rod 21, located in and concentrically with the vertical cylinder 4, having raised the top of the bladder 1 and the top bead 1" has been unclamped by separating upper plate ring 20 and bead ring 22.

Once the worn bladder 1 has been withdrawn, a new bladder may be clamped in place, after positioning between the top and bottom molds, by first placing the lower bead 1' squarely on the lower bead ring 3 and then actuating a piston in the power cylinder 7 such that its rod 7' moves as illustrated in FIG. 2 which in turn produces corresponding movement of the clevis 8 causing the erection of the toggle links 9,10. The erection is preferably effected in such a manner that the dead center point or linear alignment of the toggle links 9,10 is exceeded only slightly. The vertical cylinder 4 is lowered through action of the lever 13 to secure the lower bead 1' of the bladder 1. It should be noted that undesired unclamping or release of the lower bead 1' of the bladder 1 cannot result from accidental withdrawal or loss of fluid pressure in the power cylinder 7, since the toggle links 9,10 are mechanically locked in one direction by the extended end 9' of link 9 which engages the toggle link 10 (FIG. 2) and in the other direction by slightly exceeding the dead center point as described above, thus also ensuring a very stable clamping. The upper bead 1" of the bladder 1 is positively clamped by upper plate ring 20 and bead ring 22, independent of clamping of lower bead 1'.

The collapse of the bladder 1 is realized by descending motion of the piston rod 21 in and concentric with the vertical cylinder 4, as illustrated in FIG. 2. Adjustment of vertical travel of cylinder 4 to match a particular tire and associated bladder size may be made with ease by means of an adjusting screw 23 and nut 23' or the like which serve to selectively vary the height of the pin 11 of the toggle link 9 relative to the fixed bearing lug 5.

Although the description has been made for the present invention with the degree of particularly requisite for understanding by persons skilled in the art, it is to be understood that the present disclosure has been made only by way of example and that numerous changes in details of construction and the combination and arrangement of parts may be resorted to without departing from the spirit and scope of the invention as hereinafter claimed.

We claim

1. In a press for shaping and curing pneumatic tires having an inflatable bladder, a stationary lower bead ring, a center mechanism including a vertical cylinder, a lower plate ring and an actuating device for positively clamping the lower bead of the bladder between the stationary lower bead ring and the lower plate ring, the actuating device being connected to the vertical cylinder of the center mechanism and comprising, drive unit means providing an output motion in a direction generally transverse to the vertical cylinder, toggle link means transforming the output motion of said drive unit means into mechanical motion acting in a direction axially of the vertical cylinder to raise and lower the vertical cylinder, and motion transmitting means connecting the output of said toggle link means to the vertical cylinder, said motion transmitting means including a lever having slot means accommodating pin means attached to the vertical cylinder.

2. Apparatus according to claim 1, wherein said drive unit means is a fluid cylinder and said toggle link means mechanically locks to prevent accidental release in the event of loss of fluid pressure in said fluid cylinder.

3. Apparatus according to claim 1, wherein said toggle link means has adjusting means permitting selective variation of the position of the vertical cylinder relative to the stationary lower bead ring.

* * * * *